UNITED STATES PATENT OFFICE.

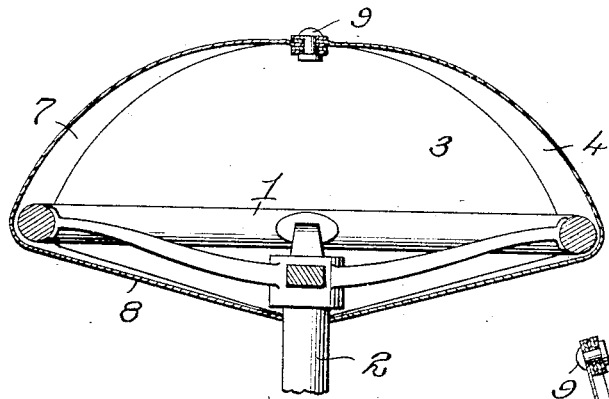
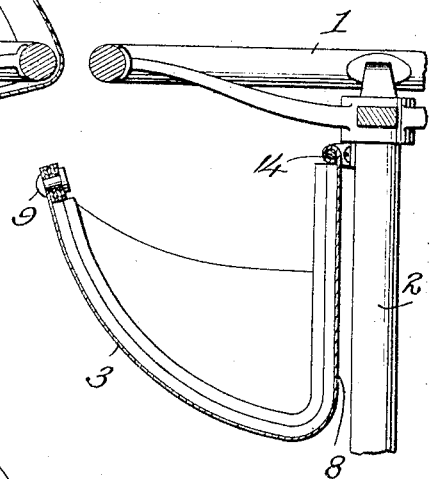
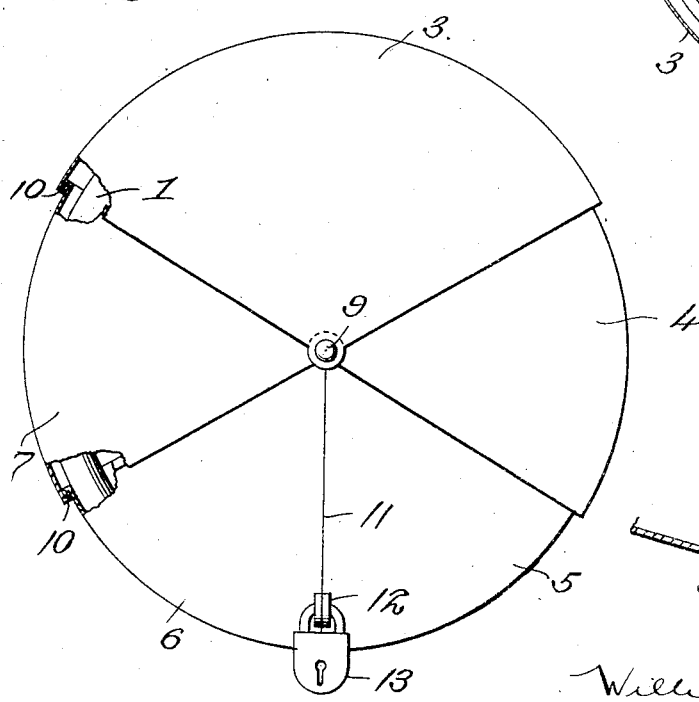
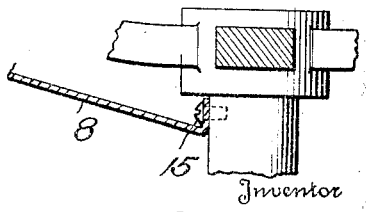

WILLIAM E. RECHER, OF PHILADELPHIA, PENNSYLVANIA.

LOCK FOR STEERING-WHEELS OF AUTOMOBILES.

1,368,054. Specification of Letters Patent. Patented Feb. 8, 1921.

Application filed July 11, 1919. Serial No. 310,202.

*To all whom it may concern:*

Be it known that I, WILLIAM E. RECHER, a citizen of the United States, residing at Philadelphia, in the county of Philadelphia and State of Pennsylvania, have invented certain new and useful Improvements in Locks for Steering-Wheels of Automobiles; and I do hereby declare the following to be a full, clear, and exact description of the invention, such as will enable others skilled in the art to which it appertains to make and use the same.

This invention relates to a lock for steering wheels of automobiles.

An object of the invention resides in the provision of a device which may be applied to the steering wheel of an automobile and will so inclose the wheel that it will be impossible for an unauthorized person to have access to the same.

Furthermore, it is an object of the invention to construct the device in such manner that when not in use it may be telescoped or collapsed so that it may be stored in a comparatively small space.

It is a still further object of the invention to so construct the device that it may be easily manipulated to either lock or release the steering wheel.

In the drawing:

Figure 1 is a sectional view of a device constructed in accordance with my invention, showing the same in place on a steering wheel and post;

Fig. 2 is a plan view of the same with portions broken away to show the joint between the sections;

Fig. 3 is a sectional view of a modified form of the device, showing the same in its collapsed and inoperative position, and Fig. 4 is a detail of a second modification.

In Fig. 1 of the drawing I have illustrated a steering wheel 1, which is mounted on the steering post 2 in the usual manner and is made up of a hand portion and spokes, which latter radiate from the usual hub or bearing. The form of my device illustrated in this figure includes a plurality of sections 3, 4, 5, 6 and 7 which substantially are in the form of a sector, forming, however, when in their extended positions a dome-like inclosure. Each of these sections is provided with an inwardly extending flange 8 and the sections are pivoted together on a common pivot 9. The section 3 is of substantially twice the size of the sections 4 and 5 and of the sections 6 and 7, for a purpose which will later appear. It is to be noted that the edges of the sections are provided with interlocking flanges, as illustrated at 10 in Fig. 2 of the drawing, and these flanges extend completely from the pivot point 9 to the lower end of the flanges 8. However, the abutting edges 11 of the sections 5 and 6 are not provided with interlocking flanges, but are provided with lugs 12 for the accommodation of a padlock or other lock 13. With this construction the section 5 may be telescoped within the section 4 and these two sections 4 and 5 thus telescoped may be telescoped within the section 3, consuming, however, only part of the latter section. The sections 6 and 7 may be telescoped in like manner and also telescoped within the section 3, so that the device may be removed from the steering wheel and so that its size may be materially reduced for storing. In this connection it is to be remembered that the economy of space in any automobile is a very vital factor and, therefore, the collapsing or telescoping of the several sections of applicant's device makes it possible to use the same without consuming any considerable space when the device is stored and not operative to lock the wheel. When the sections are telescoped or collapsed as above referred to, the section 3 may be placed over the upper portion of the wheel and the lugs 12 grasped. These lugs may then be drawn downwardly and the flanges 10 at the abutting edges of the sections 6 and 7 and of the sections 4 and 5 will cause the sections to be drawn from within each other and from within the section 3. Furthermore, when the device is fully extended the flanges 10 will be so interlocked that access to the interior of the device will be prevented and consequently it will be impossible for an unauthorized person to grasp or turn the steering wheel. Therefore, the steering of the automobile will be impossible and the theft of the machine will be prevented.

In Fig. 3 of the drawing I have shown the device somewhat modified, the modification consisting in the provision of a pivotal connection at 14 between the flange 8 of the section 3 and the post 2 of the steering mechanism. This permits the device, after being collapsed in the manner above described to be swung into such a position as illustrated in Fig. 3 so that it depends beneath the steering wheel and from the steering post. It will be noted that the device has been made dome shaped, and this is done for two purposes. While I have illustrated a steering wheel where the spokes extend outwardly below the hand or grip portion, steering wheels of the opposite form, that is to say, where the spokes extend upwardly, are common and, therefore, the making of the device dome-shaped will accommodate either wheel. Furthermore, it will permit the swinging of the device to its operative position and to its inoperative position as illustrated in Fig. 3.

In Fig. 4 I have illustrated a second modification, wherein the general form of the device is identical with that already described, but the flange 8 of the section 3 is rigidly fastened at 15 to the steering post. By fastening the section 3 to the steering post as illustrated, the sections 4 and 5 may be telescoped within each other as may also the sections 6 and 7 and these pairs of sections may be telescoped within the section 3. When all of the sections are thus telescoped they will remain in place on the steering wheel and will occupy the upper portion thereof. As this portion is very little, if ever used in proper driving, the device will not interfere at all with the steering of the machine and will be in an exceedingly convenient position to be closed over the wheel when the operator leaves the machine.

From the above description it will be seen that I have provided a device which will consume the minimum room when stored in an automobile and which will effectively lock the steering wheel against manipulation and, therefore, will prevent the removal of the machine by an unauthorized person.

While I have illustrated particular forms of the device, it is to be understood that various modifications in the forms may be made without departing from the spirit of the invention or exceeding the scope of the claims.

What I claim is:—

1. A lock for automobile steering wheels, comprising a casing consisting of a plurality of telescopic sections having flanges adapted to interlock when the sections are extended and means for locking said sections in their extended position.

2. A lock for automobile steering wheels, comprising a casing consisting of a plurality of sections pivoted on a common axis, said sections being adapted to telescope and having flanges arranged to interlock when the sections are extended and means for locking said sections in their extended position.

3. A lock for automobile steering wheels, comprising a casing consisting of a plurality of sections pivoted together, one of said sections being larger than the others, the smaller sections being adapted to telescope within each other and when telescoped to telescope within the larger section, two of said smaller sections adapted to abut when in extended position and means for locking said sections together.

4. The combination with a steering wheel and post, of a casing consisting of a plurality of sections pivoted together, one of said sections being secured to the steering post, the other of said sections being movable and adapted to telescope within each other and within the first section, two of said smaller sections adapted to abut when in extended position and means for locking said sections together.

5. The combination with a steering wheel and post, of a casing consisting of a plurality of sections pivoted together, one of said sections being secured to the steering post, the other of said sections being movable and adapted to telescope within each other and within the first section, said sections having interlocking flanges adapted to interlock when the sections are extended and means for positively locking said sections in their extended position.

In testimony whereof I affix my signature.

WILLIAM E. RECHER.